Nov. 21, 1961  T. R. THOMAS  3,009,997
SIGNAL SYSTEM FOR LUBRICATING INSTALLATION
Filed July 20, 1959  4 Sheets-Sheet 1
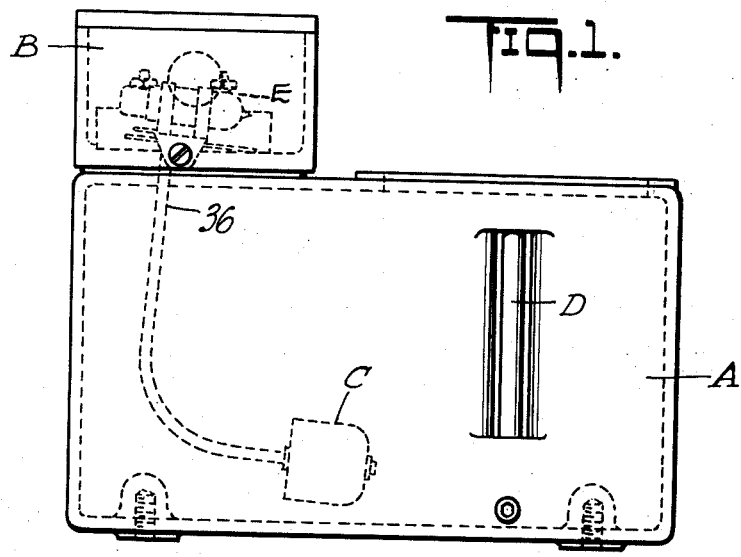
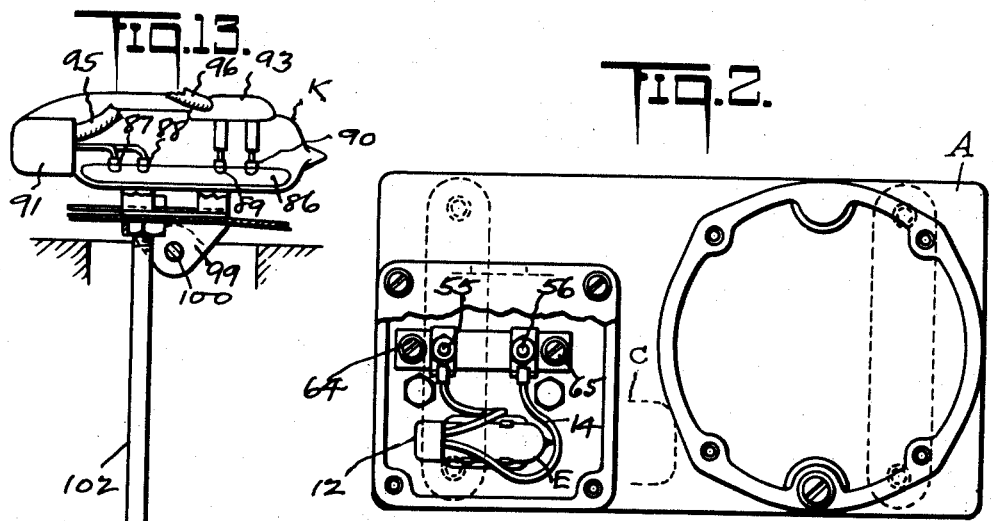
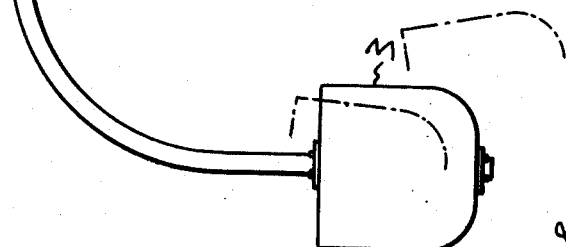
INVENTOR
*Thomas R. Thomas*
BY
ATTORNEYS Nov. 21, 1961 T. R. THOMAS 3,009,997
SIGNAL SYSTEM FOR LUBRICATING INSTALLATION
Filed July 20, 1959 4 Sheets-Sheet 2
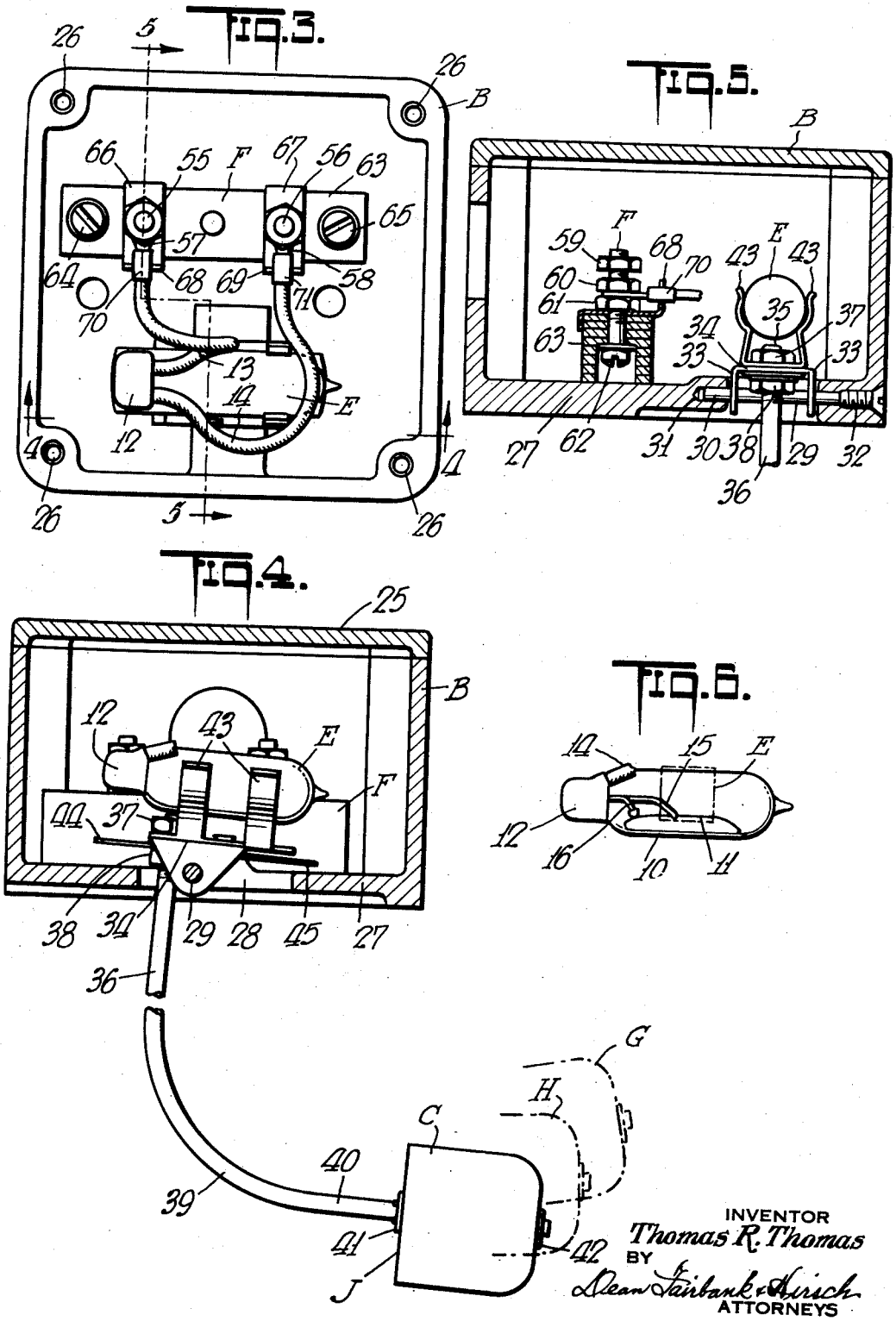
INVENTOR
Thomas R. Thomas
BY
Dean Fairbank & Hirsch
ATTORNEYS

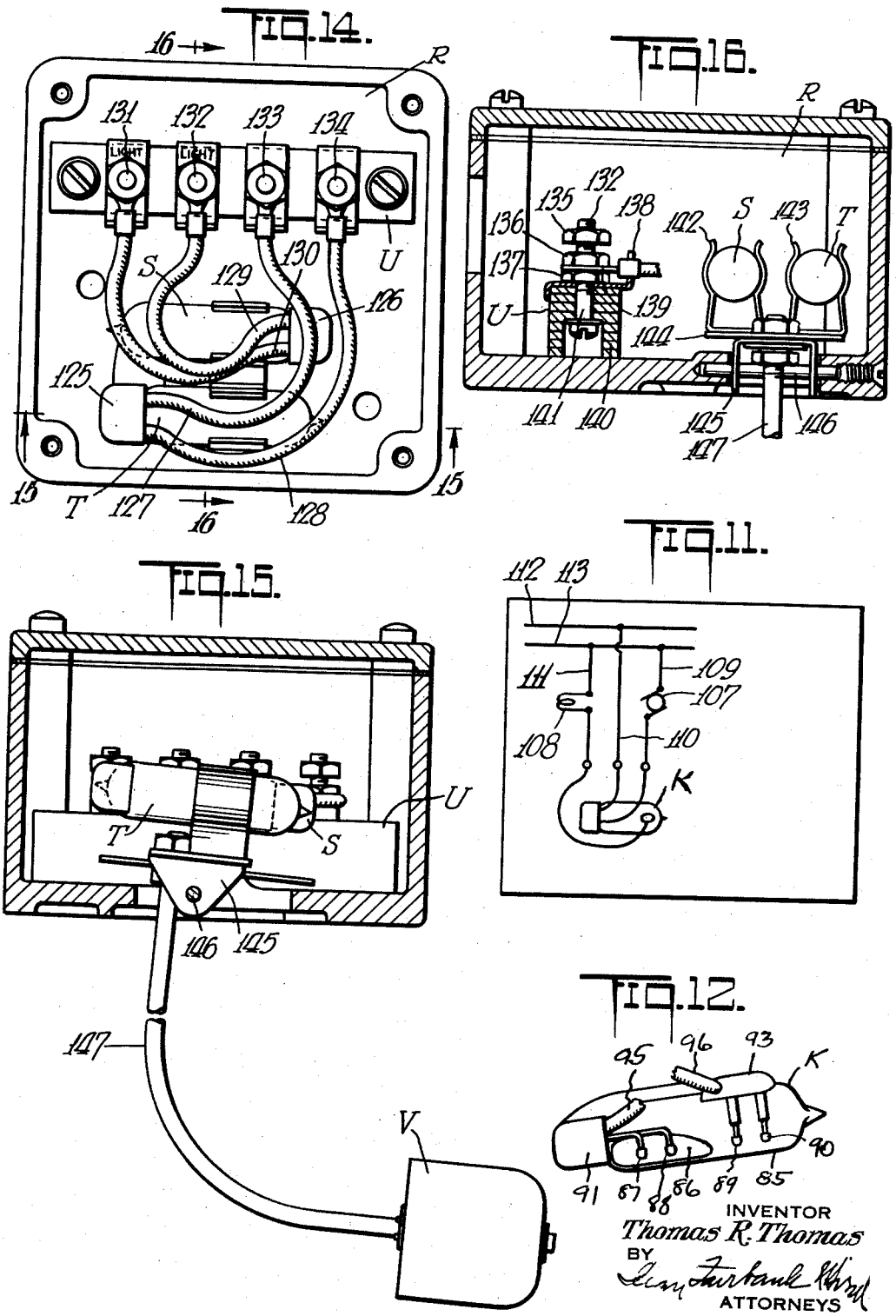

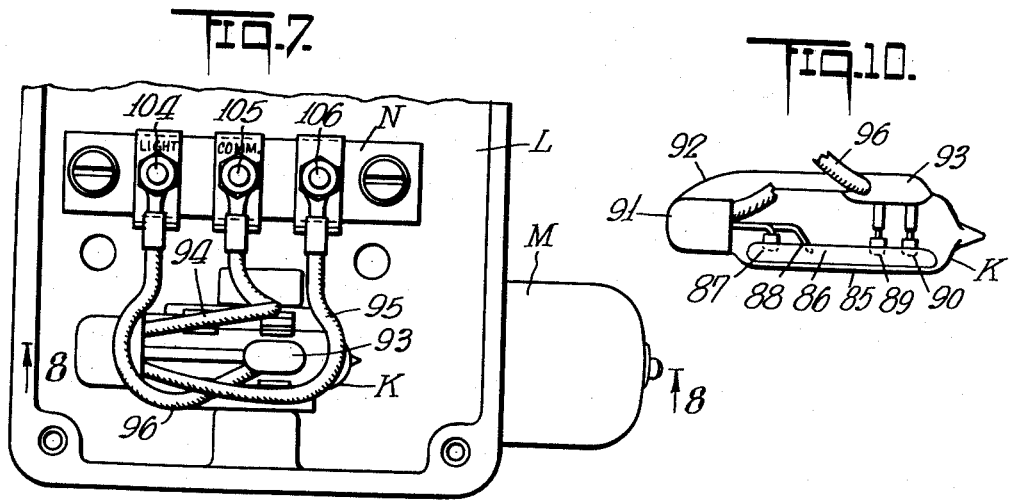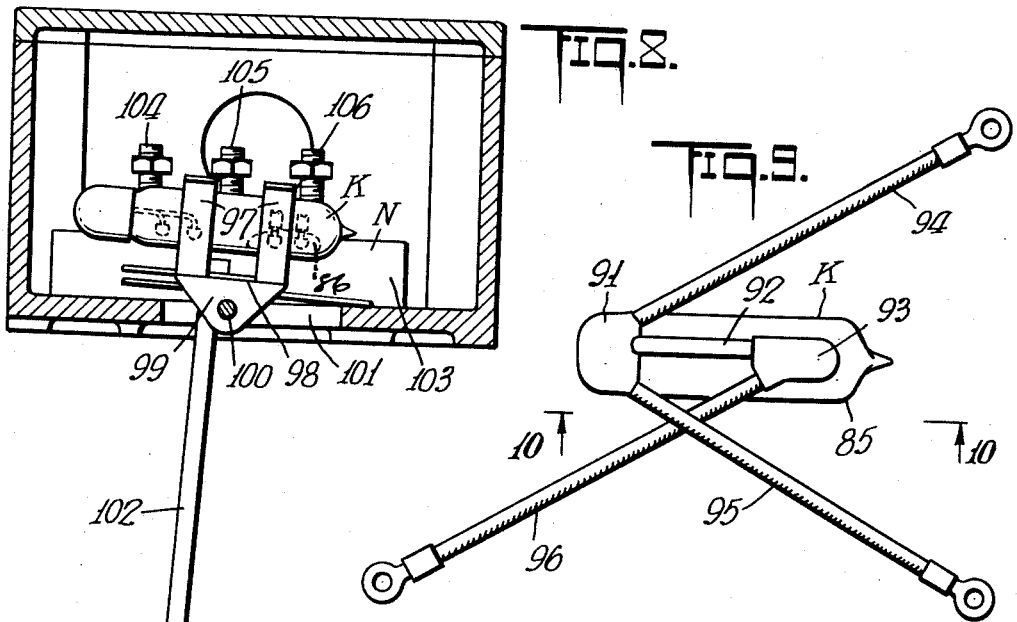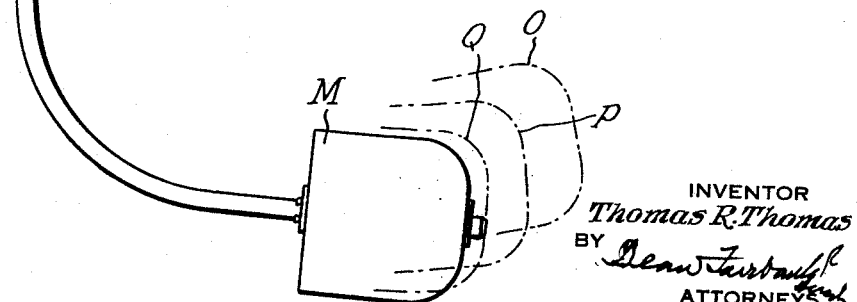

United States Patent Office 3,009,997
Patented Nov. 21, 1961

3,009,997
SIGNAL SYSTEM FOR LUBRICATING INSTALLATION
Thomas R. Thomas, New York, N.Y., assignor to Auto Research Corporation, Dover, Del., a corporation of Delaware
Filed July 20, 1959, Ser. No. 828,116
10 Claims. (Cl. 200—84)

The above invention relates to a signal system for lubricating installation.

In lubricating installations generally of the centralized type a relatively remote reservoir is provided containing a reciprocating or gear pump which feeds lubricant continuously through a piping system leading to the various bearings in and about the mechanism over considerable distances.

Such lubricating systems are designed to be operated over long periods of time and to supply relatively minute yet relatively accurate portions of lubricant to the mechanism throughout operation thereof.

In automatic machinery it is quite important that the operation of these lubricating installations be reliable and be efficient over long periods of time and in this connection also replenishment of the lubricant in the reservoir is required at relatively infrequent intervals which may well be overlooked resulting in a breakdown of the lubricating installation or to the machine to which it is attached.

It is therefore among the objects of the present invention to provide a reliable, efficient, low cost signal system which will quickly indicate to the person in charge or to the attendant on the mechanism being lubricated that replenishment of the supply of lubricant is necessary, without any likelihood of the machine operating without the necessary lubricant supply.

Another object is to provide a reliable, automatically actuated signal system which will promptly respond to the depletion of the supply of lubricant in the system and which will assure prompt attention of the attendant who is to replenish the lubricant supply.

Still further objects and advantages will appear in the more detailed description set forth below, it being understood, however, that this more detailed description is given by way of illustration and explanation only and not by way of limitation, since various changes therein may be made by those skilled in the art without departing from the scope and spirit of the present invention.

In accomplishing the above objects, it has been found most satisfactory according to one embodiment of the present invention to provide a signal system which will be automatically actuated by the level of lubricant in the reservoir, and which will promptly indicate approaching depletion of the lubricant supply and also indicate that such supply has been so diminished as to result in necessity of stoppage of the mechanism.

In the preferred embodiment of the present invention on the cover of the reservoir is desirably mounted a mercury switch the closure contacts of which will be independent of and protected from any fumes, vapors or atmospheric conditions in or around the machine to be lubricated.

Associated with this mercury switch is desirably a float which will be sensitive or actuated by the level of the lubricant in the reservoir and which may be actuated in its up position to disconnect the mercury switch, and in its down position to cause a circuit closure with resultant signal or actual stoppage of the mechanism.

Desirably, a signal arrangement is provided which will be responsive to different positions of the float and of the mercury switch, one to give a preliminary warning signal when the lubricant is approaching depletion and the other which will give a final warning, signal or even cause stoppage of the machine. Various types of warning devices may be employed or actuated such as horns, lights or buzzers.

In one form of the invention a mercury switch is usually caused to be biased in an inclined position when the reservoir is full. When the reservoir is depleted to a predetermined level the mercury tube will then reach horizontal position and make a contact which will actuate a preliminary warning light. Then, as the oil or lubricant level is permitted to recede further a final warning signal is provided where the motor circuit is opened and the machine will be stopped.

These arrangements are particularly suitable for printing machinery and large automatic canning, packaging or filling mechanisms where the attention of the attendant is mostly occupied in normal operating of the machine for its intended purpose with very little attention being given to the lubrication.

When the warning signal is not heeded, it is preferred that the machine will stop automatically.

Basically the present invention will give a warning light or a buzzer signal when the oil is depleted and approaching exhaustion and unless the oil supply is replenished, during the warning, the machine will automatically be cut off or stopped before a bearing or multitude of bearings have been damaged because of lack of lubricant.

With the foregoing and other objects in view the invention consists of the novel construction, combination and arrangement of parts as hereinafter more specifically described, and illustrated in the accompanying drawings, wherein is shown an embodiment of the invention, but it is to be understood that changes, variations and modifications can be resorted to which fall within the scope of the claims hereunto appended.

In the drawings wherein like reference characters denote corresponding parts throughout the several views:

FIG. 1 is a side elevational view of the central lubricating reservoir showing the signal arrangement of the present invention associated therewith.

FIG. 2 is a top plan view of the reservoir.

FIG. 3 is a top plan view of the signal switch arrangement as shown in FIG. 2 but removed from the mechanism and upon an increased scale as compared to FIG. 2.

FIG. 4 is a transverse vertical sectional view upon the line 4—4 of FIG. 3 showing the switch and the float.

FIG. 5 is a transverse sectional view upon the line 5—5 of FIG. 3.

FIG. 6 is a side elevational view of the mercury tube of FIGS. 3, 4 and 5 showing the position of the contacts within the tube and the mercury pool.

FIG. 7 is a top plan view of a mercury switch arrangement in its cover receptacle with the top of the receptacle removed.

FIG. 8 is a transverse sectional view taken upon the line 8—8 of FIG. 7.

FIG. 9 is a diagrammatic layout of the connections to the tube with the tube removed from the assembly of FIGS. 7 and 8.

FIG. 10 is a side elevational view taken from the line 10—10 of FIG. 9 showing the position of the contacts and the mercury pool.

FIG. 11 is a diagrammatic wiring circuit layout of the circuit arrangement of FIGS. 7 to 10.

FIGS. 12 and 13 are side elevational views of an alternative mercury tube arrangement showing the two different positions thereof which also may be utilized in connection with the circuit of FIG. 11.

FIG. 14 is a top plan view of an alternative switch arrangement with double oppositely directed mercury switch arrangements.

FIG. 15 is a transverse vertical sectional view upon the line 15—15 of FIG. 14.

FIG. 16 is a transverse vertical sectional view upon the line 16—16 of FIG. 14.

Referring to FIGS. 1 and 2, there is shown a reservoir A having a mercury switch receptacle B, a float actuator C and a level indicator D. As shown in FIGS. 3, 4 and 5, a two point mercury switch E is provided with the suitable circuit connections F. The dotted lines at the lower part of FIG. 4 show the three positions of the float C, the upper position G being the reservoir full, safe operating position, the intermediate position H being the preliminary warning position and the final position J which is in broken or open motor switch position.

Normally in position G the mercury switch E is inclined down toward the left; in position H the mercury switch is held horizontal, and in position J the mercury switch is inclined down toward the right. The resultant operation is best indicated in FIG. 6. In FIG. 6, there is a glass envelope 10 in which there is provided a pool of mercury 11. The base 12 of the envelope has two leads or connections 13 or 14 which are respectively connected internally to the contact members 15 and 16.

When the mercury pool 11 is to the left, it will establish a circuit between the internal contacts 15 and 16 and the external connections 13 and 14 and energize a relay which will permit the machine to operate and inactivate any signal.

On the other hand, at the float position H the mercury pool is starting to leave one of the contacts 15 or 16 and may cause intermittent signal operation with the relay being deenergized and dropping its armature from time to time. To avoid this condition of erratic performance, the contact or pole of the switch is treated with amalgam causing the mercury to cling thereto, until a slightly declined position of tube is reached.

After breaking away from the pole, the mercury would run off into lower corner under its own weight giving positive action.

In position J the mercury pool 11 will break away from the internal contacts 15 and 16 to the right end of the tube and the external relay will be deenergized and establish a closing circuit containing a buzzer, horn or light or causing actuating of a disconnect switch to stop the machine.

Referring particularly to FIGS. 3, 4 and 5 the receptacle B has a cover 25 with screw connections at the corners 26. The base or bottom wall 27 of the receptacle has a central opening 28 across which projects the pivot pin 29.

The inside end 30 of the pivot pin 29 is held in the recess 31 in the base wall 27. Externally the set screw 32 will hold said pivot pin 29 in position.

The pivot pin 29 extends through the downwardly projecting ears 33 which extend downwardly from the table 34. The table 34 is connected to the upper end 35 of the downwardly extending shaft 36 by means of the lock nuts 37 and 38.

The rod extension 36 extends downwardly and is curved as indicated at 39 adjacent the bottom of the reservoir and it continues in the horizontal position 40 and it extends through one axial portion of the float C which is held in position thereon by the washers 41 and 42.

Also clamped upon the table 34 are the double spring clips 43 which hold the glass envelope E and into which or from which the glass envelope E may be readily lodged or dislodged.

The table 34 has the lower extensions 44 and 45 which act as stops to limit the movement thereof.

These stops 44 and 45 may consist of spring finger extensions.

The wire connections 13 and 14 extend to the binding posts 55 and 56 to which the rings 57 and 58 are connected by means of the nuts 59, 60 and 61. Extending downwardly from the nut 61 is the connection post 62 which is held on the laminated insulating pile 63. The ends of the laminated pile 63 are held down by means of the screws 64 and 65.

Extending across the top of the pile 63 are the clips 66 and 67 which have fingers 68 and 69 to hold the external wire connections 13 and 14 in proper position at the collars 70 and 71.

In the arrangements shown in FIGS. 1 to 6, a two post or two point switch arrangement is shown which will move through a certain angular motion to break a circuit or make one, or work in combination with a warning device such as a light or buzzer.

This arrangement is particularly suitable for complex printing machinery, and the mercury switch E will act as a cut off switch only and will cause the machine to stop automatically when the oil level is past refill level or reaches a danger point.

The same construction could be arranged by reversing the position of the mercury switch by 180° in which a signal device would be obtained.

The voltage may be 115 volts with 8 to 10 amperes or 230 volts with 4 or 5 amperes rating. Refilling the reservoir will automatically reset the switch to safe position.

Although there is considerable variation possible the arrangement shown in FIGS. 1 to 6 is particularly designed for reservoirs having a depth of about 5 to 6 inches.

In the arrangement shown in FIGS. 7 to 10 the mercury switch K is enclosed in the container L and has a float M and a circuit connection arrangement N.

The mercury switch K as shown in FIGS. 9 and 10 has an envelope 85 with a mercury pool 86 and the internal connections 87 and 88 at one end of the envelope and 89 and 90 at the other end of the envelope.

Externally there is an end cap 91 with a longitudinal connection 92 between the end cap 91 and the nose cap 93. The end cap 91 has the cable connections 94 and 95 while the nose cap 93 has a cable connection 96. The connections 88 and 89 are joined by external link 92 terminating in cable 94. The connection 92 between caps 91 and 93 gives a common wire cable 94 for posts 88 and 89. Cable 94 carries the common electric current, cable 95 the motor line and cable 96 the signal line.

Now referring to the arrangement shown in FIGS. 7 and 8 there will be three positive positions of the float M as indicated at O, P and Q. Position O will be the safe lubricant full position; position P will be the intermediate warning position, and position Q will be the lowermost lubricant exhaust or machine stopping position. The tube K may be clipped in the spring fingers 97 mounted on the table 98 of the same construction as indicated in connection with FIGS. 3 to 5.

The depending ears 99 fit upon a transverse shaft 100 which extends through the opening 101. Extending down from the table 98 is the rod 102 which teminally carries the float M. The insulating bar 103 (see FIG. 8) carries the connection posts 104, 105, 106. The connection post 104 will connect to the cable 96, connection post 105 to the cable 94 and the connection post 106 to the cable 95.

The circuit arrangement is best shown in FIG. 11.

According to this arrangement when the mercury tube K is down to the left a circuit will be established through the motor 107 which will operate the mechanism. This corresponds to position O of the float.

When the mercury switch is horizontal the pool of mercury will close all of the contacts 87, 88, 89 and 90 keeping the motor 107 running and also lighting the preliminary signal light 108.

However, when the mercury switch is down to the right the connection to the motor 107 will be broken and the signal light will stay lit.

The circuit connections are through the leads 109, 110 and 111 and the high voltage line 112 and the low voltage line 113.

The variation in the pool of mercury is shown best in diagrammatic FIGS. 8, 12 and 13.

The pool of mercury 86 will close the connections 87 and 88 in the position of FIG. 12 while keeping the connections 89 and 90 open.

On the other hand in the position of FIG. 8 the pool of the mercury 86 will close the connections 89 and 90 opening connections 87 and 88.

All four connections will be kept closed in horizontal position of FIG. 10, or FIG. 13.

In the arrangement shown in FIGS. 7 and 8, with the high lubricant level the circuit for the machine is closed and the warning signal light is open.

As the mercury tube reaches horizontal position with a receding oil level the mercury will spread along the bottom of the tube and make contact with the warning light connection while the motor circuit is still closed.

If the oil level is permitted to recede further the motor circuit is opened and the machine stops while the signal light remains on until the reservoir is filled with oil.

The filling of the reservoir will automatically close the motor circuit and open the light signal circuit. Instead of a direct connection to the motor usually a relay connection is employed.

The arrangement of FIGS. 7 and 8 may also be utilized with either he signal light device only connected or with the motor circuit control only connected.

In the arrangement shown in FIGS. 14, 15 and 16 the receptacle R receives two opposed mercury switches S and T which have a connection block at U.

Each mercury switch S and T may be of the type shown in FIGS. 3 to 6 and they have the plastic end caps 125 and 126 which respectively have the cable connections 127 and 128 for the mercury tube T and 129 and 130 for the mercury tube S.

These tubes have connections to the binding posts 131, 132, 133 and 134. These binding posts as shown in section in FIG. 16 may be of the same construction as indicated in FIG. 5 with locking nuts 135, 136 and 137, clips 138, connection eyes 139, laminated insulators 140 and post extensions 141.

The spring clips 142 and 143 will hold the tubes S and T in position and they are mounted upon the swinging table 144 which has the pivot ears 145 mounted on the pivot post 146.

The rod 147 leads to the float V.

In the arrangement shown in FIGS. 14, 15 and 16 the two mercury switches S and T with two contact posts for each tube 131 to 134 are particularly adapted for direct current control and are particularly suitable for large machines.

It is thus apparent that the applicant has provided a relatively safe, low cost, inexpensive yet reliable system for permitting signal and operation control of the level of the lubricating machinery with assurance that a signal will be given or the machine will be stopped when a predetermined depletion of lubricant is arrived at.

This will enable operators to divert their attention to the lubricting equipment and prevent danger or machine break downs due to exhaustion of the lubricant.

While there has herein been illustrated and described the preferred embodiment of the invention, it is to be understood that applicant does not limit himself to the precise construction herein disclosed, and the right is reserved to all changes and modifications coming within the scope of the invention as defined in the appended claims.

Having now particularly described and ascertained the nature of the invention, and in what manner the same is to be performed, what is claimed is:

1. A lubricant exhaustion signal system to be utilized in connection with lubricant reservoirs of centralized lubricating equipment for mechanisms to be lubricated, comprising a pivotally mounted mercury switch, a float actuator for said switch and a circuit arrangement actuated by said switch to signal exhaustion of lubricant, said system having a horizontal elongated lubricant reservoir casing with a top wall having a removable cover at one side and a signal box at the other side on top of said wall carrying said switch, the lower side of said signal box opening into the top wall of said reservoir and a transverse pivot mount located at and in the opening so that said mercury switch will swing on an axis which is in the plane of the top wall of the reservoir.

2. A lubricating exhaustion signal system to be utilized in connection with lubricant reservoirs of centralized lubricating equipment for mechanisms to be lubricated, comprising a pivotally mounted mercury switch, a float actuator for said switch and a circuit arrangement actuated by said switch to signal exhaustion of lubricant, said mercury switch having two internal contacts actuated in one inclined position to give a warning signal and actuated in the other inclined position to cut off said warning signal, said system having a horizontal elongated lubricant reservoir casing with a top wall having a removable cover at one side and a signal box at the other side on top of said wall carrying said switch, the lower side of said signal box opening into the top wall of said reservoir and a transverse pivot mount located at and in the opening so that said mercury switch will swing on an axis which is in the plane of the top wall of the reservoir.

3. A lubricant exhaustion signal system to be utilized in connection with lubricant reservoirs of centralized lubricating equipment for mechanisms to be lubricated, comprising a pivotally mounted mercury switch, a float actuator for said switch and a circuit arrangement actuated by said switch to signal exhaustion of lubricant, said mercury switch having internal contacts in one inclined position to stop the mechanism being lubricated and in the other inclined position to permit continuation of operation of the mechanism to be lubricated, said system having a horizontal elongated lubricant reservoir casing with a top wall having a removable cover at one side and a signal box at the other side on top of said wall carrying said switch, the lower side of said signal box opening into the top wall of said reservoir and a transverse pivot mount located at and in the opening so that said mercury switch will swing on an axis which is in the plane of the top wall of the reservoir.

4. A lubricant exhaustion signal system to be utilized in connection with lubricant reservoirs of centralized lubricating equipment for mechanisms to be lubricated, comprising a pivotally mounted mercury switch, a float actuator for said switch and a circuit arrangement actuated by said switch to signal exhaustion of lubricant, said mercury switch being mounted upon the top of the reservoir and said float being provided with a rod which extends upwardly from the bottom of the reservoir to the mercury switch, said system having a horizontal elongated lubricant reservoir casing with a top wall having a removable cover at one side and a signal box at the other side on top of said wall carrying said switch, the lower side of said signal box opening into the top wall of said reservoir and a transverse pivot mount located at and in the opening so that said mercury switch will swing on an axis which is in the plane of the top wall of the reservoir.

5. A lubricant exhaustion signal system to be utilized in connection with lubricant reservoirs of centralized lubricating equipment for mechanism to be lubricated, comprising a pivotally mounted mercury switch, a float actuator for said switch and a circuit arrangement actuated by said switch to signal exhaustion of lubricant, two of said mercury switches being arranged in opposite directions to give alternate signals, said system having a horizontal elongated lubricant reservoir casing with a top wall having a removable cover at one side and a signal box at the other side on top of said wall carrying said switch, the lower side of said signal box opening into the top wall of said reservoir and a transverse pivot mount located at and in the opening so that said mercury switch will swing on an axis which is in the plane of the top wall of the reservoir.

6. A lubricant exhaustion signal system to be utilized in connection with lubricant reservoirs of centralized lubricating equipment for mechanisms to be lubricated, comprising a pivotally mounted mercury switch, a float actuator for said switch and a circuit arrangement actuated by said switch to signal exhaustion of lubricant, said mercury switch having a plurality of internal connections so that both machine stoppage and signals may be obtained at both inclined positions of the mercury switch with an intermediate warning signal when the switch is in horizontal position, said system having a horizontal elongated lubricant reservoir casing with a top wall having a removable cover at one side and a signal box at the other side on top of said wall carrying said switch, the lower side of said signal box opening into the top wall of said reservoir and a transverse pivot mount located at and in the opening so that said mercury switch will swing on an axis which is in the plane of the top wall of the reservoir.

7. In a centralized lubricating installation for a branched distributing conduit system leading to a plurality of bearings to be lubricated, a central lubricant reservoir pump and signal unit comprising a rectangular pump housing having an uninterrupted interior chamber with the pump assembly at the pump side and the signal assembly at the signal side, the housing having a top wall with a signal opening at the signal side and a pump cover opening at the pump side, a rectangular signal housing mounted on the top wall at the signal side having an opening in its bottom opening into the signal opening, an elongated mercury bulb having a connection cap adjacent at the outside of the pump housing and extending from said outside toward the pump side in said signal housing, a horizontal carrier plate for said mercury bulb positioned directly above and covering signal opening, downwardly extending pivot connections from said plate, a pivot member associated with said connections including a transversely extending pivot rod at the level of the bottom of the signal housing and the top of the pump housing, a float positioned in the bottom of the pump housing midway between the ends of the pump housing and between the signal side and the pump side and a right angular actuating arm extending between said float and said carrier plate 8. The unit of claim 7, said mercury bulb having a plurality of electrical connections at the outside and inside ends thereof, one set of connections is to give a signal of low level in the pump housing and the other set of connections is to give a signal of exhaustion level in the pump housing.

9. The unit of claim 7, said mercury bulb having two elements positioned in side by side relationship and spring clips to hold said bulbs upon said carrier plate and a connection plate mounted in the bottom of said signal housing and parallel to the axis of the mercury bulb and having connections to the mercury bulb extending in loops through and in the upper part of said signal housing chamber.

10. The unit of claim 7, an inverted U-shaped bracket carrying such plate and bolted to the lower side of said plate and having the side flanges extending into and through said signal opening and said transverse pivot rod extending through and into the bottom wall of said signal housing and across the opening in the bottom of said signal housing and a removable cover for said signal housing.

References Cited in the file of this patent

UNITED STATES PATENTS

| | | |
|---|---|---|
| 1,574,129 | Smith | Feb. 23, 1926 |
| 1,757,970 | McCabe | May 13, 1930 |
| 1,760,382 | Teesdale | May 27, 1930 |
| 1,854,316 | Teesdale | Apr. 19, 1932 |
| 2,050,521 | Chapin | Aug. 11, 1936 |
| 2,442,275 | Mayer | May 25, 1948 |

FOREIGN PATENTS

| | | |
|---|---|---|
| 4,507 | Netherlands | Jan. 2, 1920 |